Figure 1:
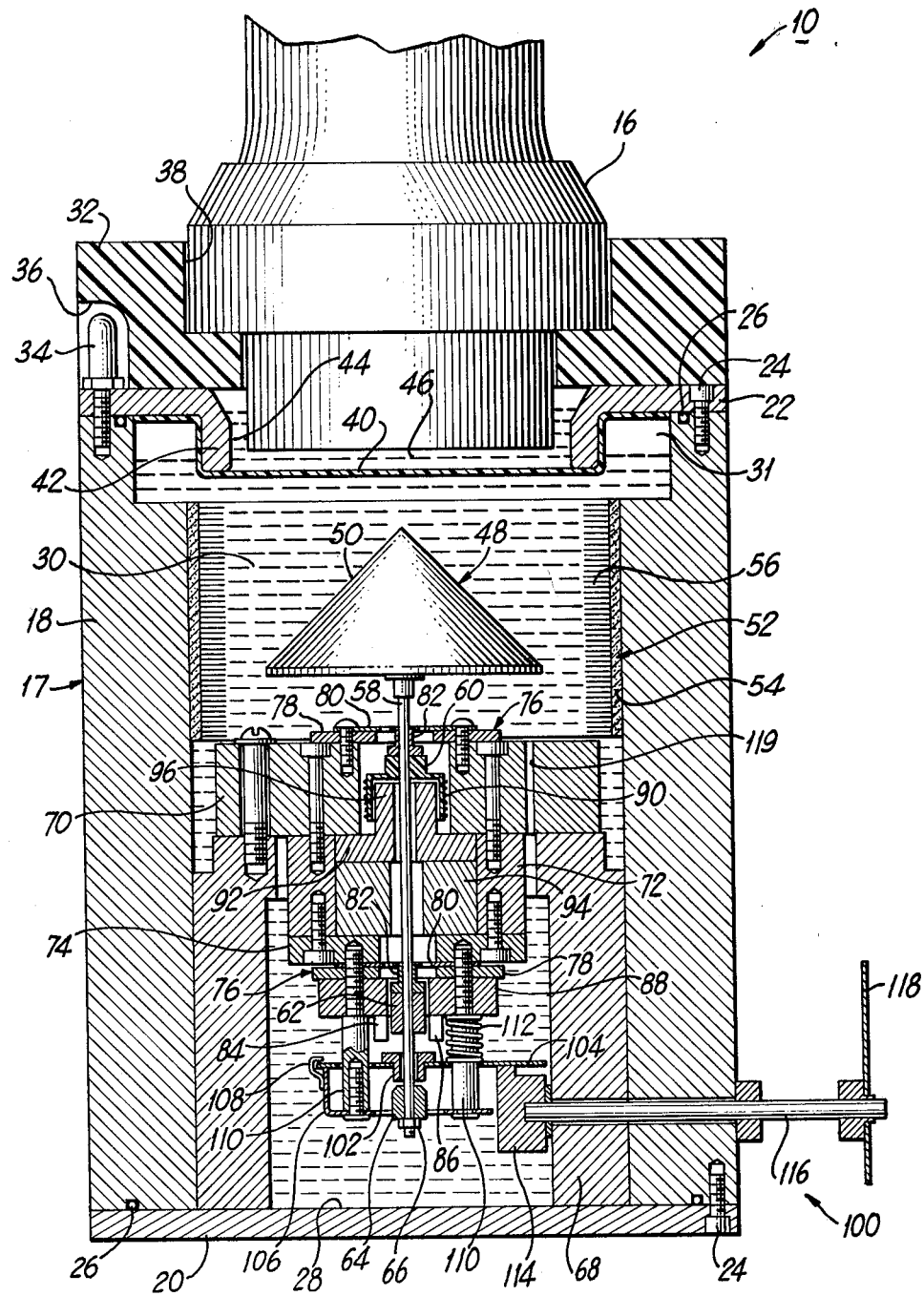

United States Patent [19]

Dominy et al.

[11] 4,181,004
[45] Jan. 1, 1980

[54] ULTRASOUND WATTMETER

[75] Inventors: Francis I. Dominy; Leslie W. Partridge, both of Janesville, Wis.; Veikko K. Peltola, Chicago, Ill.

[73] Assignee: The Burdick Corporation, Milton, Wis.

[21] Appl. No.: 870,135

[22] Filed: Jan. 17, 1978

[51] Int. Cl.² .................................................. G01H 3/10
[52] U.S. Cl. .................................................. 73/1 DV
[58] Field of Search .............................. 73/1 DV, 646

[56] References Cited

U.S. PATENT DOCUMENTS

| 2,531,844 | 11/1950 | Fiedler | 73/646 |
|---|---|---|---|
| 2,827,978 | 3/1958 | Henry | 73/646 |
| 2,874,794 | 2/1959 | Kiernan | 73/646 |
| 2,939,542 | 6/1960 | Weller et al. | 73/646 |
| 3,626,364 | 6/1971 | Simon | 340/17 |
| 3,915,017 | 10/1975 | Robinson | 73/646 |

OTHER PUBLICATIONS

Hueter et al., Sonics, John Wiley and Sons, Inc., New York, 1955 pp. 45–49.
J. A. Rooney, Determination of Acoustic Power Outputs in the Microwatt—Milliwatt Range, Ultrasound in Med. and Biol., vol. 1, No. 1, Sep. 1973, p. 13–16, Pergamon Press, Gr. Br.

Primary Examiner—Anthony V. Ciarlante
Attorney, Agent, or Firm—Mason, Kolehmainen, Rathburn & Wyss

[57] ABSTRACT

An ultrasound wattmeter for measuring the magnitude of energy radiated by a therapeutic ultrasound applicator includes a sealed, oil-filled housing within which a float assembly is suspended. The float assembly includes an ultrasound reflective float as well as a coil and a vane supported by the float. The float assembly assumes a null position in the absence of ultrasonic radiation. A window in the housing permits the application of ultrasonic energy from the applicator to the float for urging the float assembly in one direction from the null position. A magnet mounted on the housing adjacent the coil urges the float assembly in the opposite direction in response to energization of the coil. A light source and a light responsive device are located adjacent the vane for providing a position signal corresponding to the position of the float assembly. An energization circuit energizes the coil in response to variations in the position signal in order to maintain the float assembly in its null position, and a meter coupled to the energization circuit provides an indication of the coil energization level which also is an indication of the ultrasonic energy radiated by the applicator.

11 Claims, 2 Drawing Figures

ULTRASOUND WATTMETER

The present invention relates to an ultrasound wattmeter for measuring the magnitude of energy radiated by a therapeutic ultrasound applicator.

Ultrasonic radiation is recognized to have therapeutic value. Ultrasonic therapy units are available which include a radio-frequency generator and an ultrasonic applicator having a piezoelectric disc or transducer which converts electrical energy into mechanical vibration. Vibratory energy of the transducer is transmitted from the applicator face into the body of a patient through a suitable coupling medium.

It is desirable accurately to measure the ultrasonic energy radiated by ultrasound applicators. While ultrasonic power meters have been developed in the past for measuring the radiation pressure created by sources of ultrasonic energy, such devices have been extremely expensive, complex, and delicate, for example, known devices have relied upon complex manual mechanisms and accurate reading of optical scales, and have been subject to inaccuracy resulting from corrosion, rough handling and the like. Consequently, it has not heretofore been possible for ultrasonic apparatus to be conveniently and reliably checked by portable apparatus at the point of use.

Among the important objects of the present invention are to provide an improved ultrasound wattmeter, to provide an ultrasound wattmeter which is very durable and reliable after continued use, yet which is simple, inexpensive to manufacture, and conveniently portable. Another object is to provide an ultrasound wattmeter which is extremely accurate and which does not require excessive care or expertise in use. Another object of the invention is to provide an ultrasound wattmeter which overcomes the several disadvantages of devices of this character known in the past.

In brief, in accordance with the above and other objects of the present invention there is provided an ultrasound wattmeter including a sealed, oil-filled housing having a window through which ultrasonic energy may be communicated from an ultrasound applicator. A float assembly is suspended in the housing, and has a null position in the absence of applied ultrasound radiation. The float assembly includes an ultrasound reflective float, together with a coil and a vane supported by the float. When ultrasonic energy is applied from the applicator, the float assembly is urged in one direction away from its null position. A magnet is mounted in the housing adjacent the coil, and the float assembly is urged in the opposite direction in response to energization of the coil. A light source and cooperating light responsive device adjacent the vane provide a position signal corresponding to the position of the float assembly. An energization circuit is operated in response to variations in the position signal to energize the coil and maintain the float assembly in its null position. A meter provides an indication corresponding to the energization level of the coil, thereby providing an accurate and reliable indication of the magnitude of ultrasonic energy radiated by the applicator.

Figure 2:
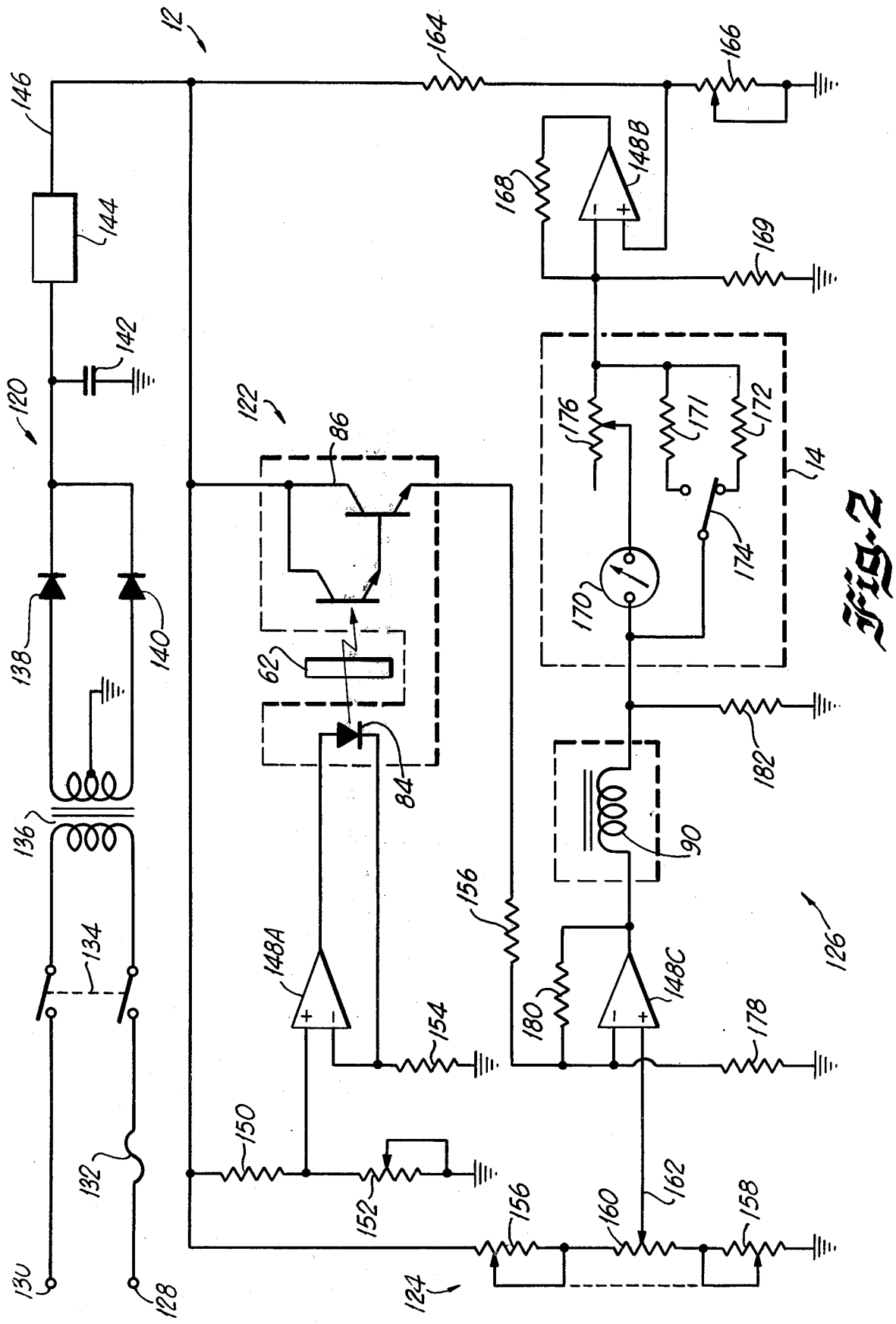

The above and other objects and advantages of the invention will appear from the following detailed description of the embodiment of the invention illustrated in the drawings, wherein:

FIG. 1 is a vertical sectional view of an ultrasound wattmeter constructed in accordance with the present invention; and FIG. 2 is a schematic diagram of the operating circuit for the ultrasound wattmeter.

Having reference now to the accompanying drawings, in FIG. 1 there is illustrated the structural portion generally designated as 10 and in FIG. 2 the accompanying control circuit generally designated as 12 of an ultrasound wattmeter embodying the principles of the present invention. The ultrasound wattmeter functions to provide an accurate and reliable indication provided by a meter 14 (FIG. 2) of ultrasound energy radiated by an applicator head 16 (FIG. 1) coupled to the structure 10.

Referring in more detail to the structure 10 illustrated in FIG. 1, there is provided a housing generally designated as 17 formed of a circular cylindrical side wall 18, the opposite ends of which are closed by means of a bottom cover 20 and a top cover 22. The covers 20 and 22 are attached to the side wall 18 by cap screws 24, and O-ring seals 26 are employed to define a sealed chamber 28 within the housing 17.

The chamber 28 is filled with a liquid 30 capable of serving as an ultrasonic coupling medium. In the illustrated embodiment of the invention, a silicone oil is used, for example a product sold by Dow Corning Corp. designated as DC200-00 Centistoke. This liquid material not only is an effective coupling medium for ultrasonic energy, but also prevents problems of corrosion which have been experienced with other liquids such as water and is non-opaque to light. In order to accommodate thermal expansion and contraction of the liquid 30, a pocket of air is trapped within chamber 28 above the liquid as indicated by reference character 31.

In order to support and locate the applicator head 16 with respect to the housing 17, a positioning plate 32 rests upon the top cover 22. The plate is located by a number of studs 34 received in recesses 36 spaced around the circumference of the plate 32. A stepped central opening 38 in the positioning plate 32 serves to support the applicator head 16, and to locate the applicator relative to the chamber 28.

To permit the radiation of ultrasonic energy from the head 16 into the chamber 28, there is provided a window element 40 formed of a suitable material such as thin metal, so as to be effectively transparent to ultrasonic radiation. The top cover is provided with a downwardly extending annular flange 42, and the window 40 is attached to the underside of the top cover 22 and forms a closure for the bottom of a receiving recess 44 defined within the flange 42. An ultrasound coupling medium such as degassed water is retained within the recess 44 to provide a coupling between the head 16 by way of the window 40 to the oil 30 within the chamber 28.

Mounted within the chamber 28 for limited vertical reciprocal movement is a float assembly generally designated as 48. The float assembly 48 includes an ultrasound radiation target in the form of a float 50. The float 50 is an air-backed membrane of Mylar or other suitable material and is effectively totally reflective to incident ultrasonic radiation. The upwardly directed surface of the float 50 is conical, and ultrasonic radiation directed toward the float 50 from the head 16 is reflected radially outwardly in all directions and results in a net downwardly directed force on the float 50, the magnitude of which corresponds to the magnitude of ultrasonic radiation emitted by the applicator 16.

The wall of chamber 28 adjacent the float 50 is provided with a lining 52 of material effective to absorb ultrasound radiation reflected radially outwardly from float 50. In the illustrated arrangement, the absorbent lining 52 includes a backing layer 54 of a foam plastic material, together with a brush layer 56 with bristles directed inwardly toward the target or float 50. One suitable commercially available material is sold by the 3M Company and designated as Brushlon.

In addition to the float or target 50, the float assembly 48 further includes a depending support shaft or rod 58 coinciding with the central vertical axis of the float 50. Supported at spaced locations along the shaft 58 are a coil bobbin 60, a light opaque vane 62, and a ballast weight 64. The ballast weight 64 is suspended upon shaft 58 by means of a nut 66, while the bobbin 60 and vane 62 are attached to the rod in any suitable manner as by set screws (not shown).

Float assembly 48 is supported for limited vertical reciprocal movement within the chamber 28 by a structure including a cylindrical support wall 68, an upper support plate 70, an annular spacer 72, and a lower support wall 74 held in assembled relation by suitable fasteners as illustrated. A pair of similar bearing or spring assemblies 76 carried by the upper and lower supports 70 and 74 serve to position and guide the float assembly 48. Each assembly 76 includes an annular base 78, a bearing or spring member 80, and a central bushing 82 fixed to the shaft 58 of the float assembly 48. Each bearing or spring 80 comprises a spider member of a thin sheet metal material such as phosphor bronze with its outer periphery fixed to the base 78 and its inner portion fixed to bushing 82. Consequently, the bearing assemblies 76 comprise taut band bearing assemblies providing nearly frictionless support for the float assembly 48.

The volume of the float or target 50 is designed in light of the weight of the other components of the float assembly 48 so that the assembly 48 is suspended in balance or equipoise in the liquid 30. In the absence of applied ultrasonic radiation, the float assembly 48 assumes the illustrated rest or null position. The taut band bearing assemblies 76 tend to maintain the float assembly 48 in this position, but permit limited vertical movement of the float assembly 48 from the null position.

The position of the float assembly 48 is detected by a photon-coupled interrupter device including a light source 84 and a light responsive device 86 carried by a mounting plate 88 on opposite sides of the vane 62. One device suitable for this purpose is module H13B1 or H13B2 sold by the General Electric Company. This device, as illustrated schematically in FIG. 2, includes a light source in the form of a light emitting diode and a light responsive device in the form of a photon controlled darlington transistor pair.

Coil bobbin 60 supports a force coil 90 which may comprise a single winding layer of fine wire. A permanent magnet 92 is supported adjacent the upper support 70 by a spacer element 94, and includes an annular nose portion 96 telescoping with and closely adjacent the coil 90. A vertically directed force is applied to the float assembly 48 by energization of the coil 90 in the manner described below, and the coil 90 and magnet 92 are oriented to the end that upon energization of the coil, the float assembly 48 is urged to move in an upward direction in opposition to the downward force resulting from the application of ultrasonic radiation to the float 50 by the head 16.

In accordance with a feature of the invention, there is provided an assembly generally designated as 100 for calibrating the ultrasonic wattmeter. A calibration weight 102 surrounds the shaft 58 with substantial clearance so that the shaft is free to move without interference. Normally the weight is supported by a lever 104 so that it does not contact the ballast weight 64. Lever 104 is pivoted about the end of a support bracket 106, and the pivoted end is captured by a retainer 108 overlying the lever 104. Bracket 106 is supported by a pair of posts 110, one of which is surrounded by a spring 112 serving to bias the lever 104 continuously in a downward direction.

In order to control the application of the calibration weight 102 to the float assembly 48, a cam 114 is mounted within the chamber 28 and controlled from the exterior of the housing 17 by means of a shaft 116 and an operator arm 118. In the position illustrated in FIG. 1, the cam serves to hold the lever 104 in its upper position against the force of spring 112 so that the calibration weight is supported entirely by the lever. When cam 114 is rotated to its alternative position, the lever 104 descends to deposit the calibration weight 102 upon the ballast weight 64, thereby adding the mass of calibration weight 102 to the float assembly 48.

The electrical wires for connection to the coil 90, the light source 84 and the light sensitive device 86 enter the chamber 28 through a sealed feed through disposed in a hole in the wall 18 of the housing 17 in the region of the vane 62. The wire pair extending to the coil 90 may pass through an opening 119 in the upper support 70. A plurality of openings 119 in combination with various clearances or the like permit free fluid communication throughout the chamber 28. For clarity, the electrical conductors have not been illustrated in FIG. 1.

Having reference now to FIG. 2, the control circuit 12 accompanying the apparatus of FIG. 1 is illustrated in schematic and diagrammatic form. In general, the circuit 12 includes a power supply 120, a position sensing circuit 122, a reference signal generator 124, and an energization circuit 126.

In accordance with the present invention, the energization circuit 126 operates in response to a position signal provided by the position sensing circuit 122 and in response to a reference signal supplied by the reference signal generator 124 in order to maintain the float assembly 48 in its null position by energization of the coil 90. Meter 14 is included in the energization circuit 126 and provides an indication of the magnitude of energization of coil 90 required to maintain the float 48 in its null position. Consequently, this indication corresponds to the force applied to the float assembly 48 by the ultrasound applicator head 16 or alternatively by the calibration weight 102.

More specifically, the power supply 120 includes a pair of power supply terminals 128 and 130 adapted to be interconnected with a standard source of alternating current and coupled by means of a fuse 132 and switch 134 to the primary of a transformer 136. A pair of diodes 138 and 140 coupled to the secondary of transformer 136 provide a full wave rectified signal which is filtered by capacitor 142 and applied to a three terminal integrated circuit DC regulator 144, for example a Motorola integrated circuit Model 7806. As a result, output terminal 146 of regulator 144 is maintained at a constant DC potential.

Position sensing circuit 122 includes the light emitting diode 48 and the photo darlington 86, with the coupling therebetween controlled by vane 62 of the float assembly 48. One section 148A of a multiple section integrated circuit operational amplifier is used as a constant current source for energization of the light source 84 at a constant intensity. One input terminal of the amplifier 148A is coupled to the power supply 120 by an adjustable voltage divider including resistors 150 and 152, while a resistor 154 provides a current sensing function. Current flow through the photo darlington 86 is coupled through a series limiting resistor 156 to the energization circuit 126, and varies in magnitude in accordance with the position of the float assembly 48.

The reference signal generator 124 provides a reference signal corresponding to the null position of the float assembly 48. The generator includes resistors 156, 158 and 160 forming a voltage divider between the power supply output terminal 146 and ground or reference potential. A coarse adjustment of the reference signal appearing at output terminal 162 is provided by resistors 156 and 158 comprising a duo potentiometer with ganged sections. A fine adjustment is provided by the adjustable resistor 160.

Having reference now to the energization circuit 126, the coil 90 and the meter 14 are connected in circuit together so that the meter reading is indicative of current flow through the coil 90. In accordance with the invention, it is desirable to provide a predetermined magnitude of current flow in the coil 90 when the float assembly 48 is in its null position. Consequently, a first side of the meter 14 is coupled to a section 148B of the multiple section operational amplifier serving as a constant current source to maintain a constant voltage at the first side of the meter. One input terminal of operational amplifier 148B is connected to an adjustable voltage divider including resistors 164 and 166, and the output terminal is returned to the other input terminal through a load resistor 168. Constant current flow is maintained through resistor 169, and a constant voltage drop is maintained across this resistor to ground or reference potential.

Meter 14 includes a conventional galvanometer movement 170. A pair of bypass resistors 171 and 172 are selected by a switch 174 to provide dual range meter operation. Meter calibration is effected by an adjustable resistor 176.

In order to provide for null-seeking feedback loop operation of the ultrasound wattmeter of the present invention, the energization circuit 126 is provided with a comparator in the form of section 148C of the multiple section operational amplifier functioning as a differential amplifier. The reference signal provided at output terminal 162 of the reference signal generator 124 is applied to one input terminal of the differential amplifier. The position signal provided by the position sensing circuit 122 is applied to the other input terminal from a voltage divider including the resistor 156 and a resistor 178. The output terminal of the differential amplifier is coupled to the coil 90, and a resistor 180 provides limited feedback to avoid amplifier oscillation. Energization current applied to coil 90 by the differential amplifier 148C is divided between the circuit of meter 14 and a resistor 182 connected to ground or reference potential.

In operation of the ultrasound wattmeter illustrated in FIGS. 1 and 2, the first step is to adjust the circuit to obtain a zero or other predetermined reading at meter 14 when the float assembly 48 is in the null position in the absence of loading. This is accomplished through adjustment of resistor 160 until the desired meter reading is indicated. Because of the constant voltage maintained across resistor 169 by the circuit including operational amplifier 148B, a zero reading is not obtained unless an equivalent voltage drop exists across resistor 182. Consequently, when the reference signal is adjusted to provide a zero reading, a limited current flow occurs in the force coil 90 and resistor 182. As a result, at this point a slight upward bias force is applied to the float assembly 48 by interaction of the magnet 92 and the energized coil 90. This has the advantage that the float assembly 48 can move in either direction from its null position with equal resistance for symmetrical feedback operation.

In accordance with an important feature of the present invention, after effecting the zero reading adjustment, it is possible accurately to calibrate the ultrasound wattmeter. In order to calibrate the system, the calibration assembly 100 is operated to deposit the calibration weight 102 upon the float assembly 48. The weight 102 may, for example, be precisely selected to apply to the float assembly 48 a loading equal to that applied by the desired ultrasonic radiation from the applicator head 16.

When the float assembly 48 has been loaded by the calibration weight 102, the float assembly 48 tends to move downwardly and displace the vane 62. As a result, the coupling between the light source 84 and the light sensitive device 86 tends to vary with a resulting variance in the position signal applied to the differential amplifier 148C. The tendency for a difference between the position signal and the reference signal results in increasing energization of the coil 90 to maintain the float assembly 48 in its null position. This increasing energization is reflected in a meter indication at meter 14.

To complete the calibration, resistor 166 is adjusted to provide a meter reading which has been predetermined to be equivalent to the loading effected by the calibration weight 102. As a result, it is assured that an accurate reading is obtained when the ultrasound wattmeter is subjected to energy radiated from the applicator head 16. When calibration has been completed, the calibration assembly 100 is operated to remove the calibration weight 102 from the float assembly 48.

When the zero adjustment and calibration steps have been completed, the ultrasound wattmeter is prepared to provide a reliable and accurate indication of the energy radiated by the applicator 16. The applicator is energized in the normal manner and ultrasound radiation from the transducer in the head 16 impinges upon the target or float 50 loading the float assembly 48 in the downward direction. As a result, the tendency for vane 62 to move alters the coupling between the light source 84 and the light sensitive device 86, thereby causing a tendency for a change in the position signal coupled to the energization circuit 126. The energization of force coil 90 is increased to maintain the float assembly 48 in the null position, and the resulting reading of meter 14 provides an indication of the magnitude of radiated ultrasonic energy.

While the invention has been described with reference to details of the illustrated embodiment, it should be understood that such details are not intended to limit the invention as defined in the accompanying claims.

What is claimed and desired to be secured by Letters Patent of the United States is:

1. An ultrasound wattmeter for measuring the magnitude of energy radiated by a therapeutic ultrasound applicator comprising:
   a sealed housing;
   an ultrasound coupling medium in said housing;
   a float assembly suspended in said housing and having a null position in the absence of applied ultrasound radiation;
   said float assembly including an ultrasound target float, a coil supported by said float and a vane supported by said float, said float assembly further including a support shaft extending downwardly from said float, said coil and said vane being attached at spaced positions along said shaft; and taut band bearing means coupled between said housing and said shaft;
   an ultrasound transmitting window in said housing for communicating ultrasonic energy from the applicator to said reflective float for urging said float assembly in one direction;
   a magnet mounted on said housing adjacent said coil for urging said float assembly in the opposite direction in response to energization of said coil;
   a light source at one side of said vane;
   light responsive means at the other side of said vane for providing a position signal corresponding to the position of said float assembly;
   a meter providing an indication of the energization level of said coil; and
   an energization circuit coupled to said light responsive means and to said coil for energizing said coil to maintain said float assembly in said null position in response to variations in said position signal.

2. The ultrasound wattmeter of claim 1, further comprising a signal generator coupled to said energization circuit for providing a reference signal corresponding to the null position signal provided by said light responsive means when said float assembly is in the null position; and a differential amplifier for energizing said coil at a level determined by the difference between said position and reference signals.

3. The ultrasound wattmeter of claim 2 further comprising manually operable means coupled to said reference signal generator for adjusting said reference signal to obtain a predetermined meter indication in the null position of said float assembly.

4. The ultrasound wattmeter of claim 1, said ballast means comprising a weight, a lever for supporting said weight in a first position of said lever, and a cam for moving said lever to a second position for depositing said weight onto said float assembly.

5. The ultrasound wattmeter of claim 1 further comprising a trapped pocket of air within said sealed housing above said float to permit oil expansion and contraction.

6. The ultrasound wattmeter of claim 1, said coupling medium comprising silicone oil.

7. The ultrasound wattmeter of claim 1, said float comprising an ultrasound reflective air-backed membrane of conical configuration.

8. The ultrasound wattmeter of claim 1, said meter having a predetermined zero indication corresponding to the null position of said float assembly and said energization circuit including means for applying a predetermined non-zero energization to said coil when said meter indicates zero.

9. The ultrasound wattmeter of claim 8, further comprising a calibration mass movably mounted in said housing, means for applying said calibration mass to said float assembly, and adjustable means in said energization circuit for adjusting the meter indication when said calibration mass is applied to said float assembly.

10. An ultrasound wattmeter for measuring the magnitude of energy radiated by a therapeutic ultrasound applicator comprising:
    a sealed housing;
    an ultrasound coupling medium in said housing;
    a float assembly suspended in said housing and having a null position in the absence of applied ultrasound radiation;
    said float assembly including an ultrasound target float, a coil supported by said float and a vane supported by said float;
    an ultrasound transmitting window in said housing for communicating ultrasonic energy from the applicator to said reflective float for urging said float assembly in one direction;
    a magnet mounted on said housing adjacent said coil for urging said float assembly in the opposite direction in response to energization of said coil;
    a light source at one side of said vane;
    light responsive means at the other side of said vane for providing a position signal corresponding to the position of said float assembly;
    a meter providing an indication of the energization level of said coil;
    an energization circuit coupled to said light responsive means and to said coil for energizing said coil to maintain said float assembly in said null position in response to variations in said position signal;
    a calibration ballast means within said housing; and means operable from outside said housing for selectively applying said calibration ballast means to said float assembly.

11. An ultrasound wattmeter for measuring the magnitude of energy radiated by a therapeutic ultrasound applicator comprising:
    a sealed housing;
    an ultrasound coupling medium in said housing;
    a float assembly suspended in said housing and having a null position in the absence of applied ultrasound radiation;
    said float assembly including an ultrasound target float, a support shaft extending downwardly from said float, a coil supported by said float and a vane supported by said float, said coil and said vane being attached at spaced positions along said shaft;
    an ultrasound transmitting window in said housing for communicating ultrasonic energy from the applicator to said reflective float for urging said float assembly in one direction;
    a magnet mounted on said housing adjacent said coil for urging said float assembly in the opposite direction in response to energization of said coil;
    a light source at one side of said vane;
    light responsive means at the other side of said vane for providing a position signal corresponding to the position of said float assembly;
    a meter providing an indication of the energization level of said coil; and
    an energization circuit coupled to said light responsive means and to said coil for energizing said coil to maintain said float assembly in said null position in response to variations in said position signal.

* * * * *